United States Patent
Wu et al.

(10) Patent No.: US 10,444,596 B1
(45) Date of Patent: Oct. 15, 2019

(54) LENS-BASED INTEGRATED TWO-DIMENSIONAL BEAM STEERING DEVICE

(71) Applicant: Shanghai Jiao Tong University, Shanghai (CN)

(72) Inventors: Kan Wu, Shanghai (CN); Xianyi Cao, Shanghai (CN); Chao Li, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/255,802

(22) Filed: Jan. 23, 2019

(30) Foreign Application Priority Data

Oct. 22, 2018 (CN) .......................... 2018 1 1227254

(51) Int. Cl.
*G02F 1/313* (2006.01)
*G02B 6/12* (2006.01)

(52) U.S. Cl.
CPC ....... *G02F 1/3137* (2013.01); *G02B 6/12004* (2013.01)

(58) Field of Classification Search
CPC ...... G02B 6/1221; G02B 6/28; G02B 6/0026; G02B 6/0035; G02B 6/0033; G02B 6/0036; G02B 6/12004; G02F 1/3137; G01S 17/66; G01S 17/88; G01S 17/89; H01Q 3/2676

See application file for complete search history.

(56) References Cited

U.S. PATENT DOCUMENTS

| 5,333,000 | A  | * | 7/1994 | Hietala | ..................... G02F 2/02 342/368 |
| 6,208,293 | B1 | * | 3/2001 | Adams | ................. G02B 6/4295 342/368 |
| 7,724,994 | B1 | * | 5/2010 | Pepper | .................... G02F 1/313 342/375 |
| 7,729,572 | B1 | * | 6/2010 | Pepper | ............... G02B 6/12004 342/375 |

* cited by examiner

*Primary Examiner* — John Bedtelyon
(74) *Attorney, Agent, or Firm* — Mei & Mark LLP; Manni Li

(57) ABSTRACT

A lens-based integrated two-dimensional beam steering device comprising a substrate, an input waveguide, a connecting waveguide, a 1×N optical switch, an electrical interface for the switch, N output waveguides of the switch, N transmitting units, a lens and a controller. The device of the present invention realizes two-dimensional beam steering and has the characteristics of large power capacity, low control complexity, and low electric power consumption.

12 Claims, 6 Drawing Sheets

LENS-BASED INTEGRATED TWO-DIMENSIONAL BEAM STEERING DEVICE

CROSS-REFERENCE TO RELATED APPLICATION

The subject application claims priority on Chinese patent application CN201811227254.1 filed on Oct. 22, 2018 in China. The contents and subject matter of the Chinese priority application is incorporated herein by reference.

FIELD OF INVENTION

The present invention relates to beam steering, particularly, an integrated two-dimensional beam steering device that is based on lens.

BACKGROUND ART

Laser radar plays an important role in the field of automatic navigation, such as self-driving cars and unmanned aircraft. The device for steering laser beam is the core component of the laser radar. The current common beam steering device is mainly based on mechanical rotation, large in size, high in power consumption, and susceptible to vibration and the like. Compared with beam steering device based on mechanical rotation, all-solid-state beam steering device has become a hot spot because of its smaller size, lower power consumption, and less susceptible to vibration interference.

All-Solid-State Beam Steering Devices that have been Reported so Far Mainly Adopt the Following Solutions:

The first solution is based on a liquid crystal phase shifter. Phase control of the input optical signal and steering of the beam are realized by applying voltage to the electrodes of the liquid crystal phase shifter. The solution has disadvantages of slow scanning, no withstanding of high input optical power, and high cost.

The second solution is based on Microelectro Mechanical Systems (MEMS). The solution realizes beam steering by controlling the angle of the MEMS mirror. Similar to the first solution, the second solution has the disadvantage that it cannot withstand high input optical power.

The third solution is based on an integrated optical phased array. The solution realizes transmitting beam steering by changing the phase of the optical signal on the integrated chip. The solution requires phase control of all optical signals on the integrated chip, and has high control complexity and high power consumption.

The fourth solution is based on the integrated planar lens and grating emission. The solution prepares a planar lens with several input waveguides on the integrated chip. Each input waveguide inputs the optical signal to the planar lens at a specific angle. The output optical signal is a parallel beam propagating along a specific direction on the plane, and finally the light is emitted into the free space through the grating. Beam steering in free space is realized by switching the optical signal to different lens input waveguide through the integrated optical switch. The lens in the solution needs to use the material different from the waveguides. The solution has disadvantage of large loss and only one-dimensional scanning can be realized without changing the wavelength of the input light.

In summary, the above solutions are limited in power capacity, either in the control complexity and electrical power consumption, or in the two-dimensional scanning capability. Therefore, there is a need for a beam steering device that is capable of overcoming the above-mentioned deficiencies, has high power capacity, low control complexity, and low electrical power consumption, and is capable of realizing two-dimensional scanning without changing the wavelength of light.

SUMMARY OF THE INVENTION

The present invention aims at overcoming the deficiencies of the existing technology and providing an integrated beam steering device based on lens and capable of realizing two-dimensional beam steering with large power capacity, low control complexity, and low electric power consumption.

To Solve the Above Problems, the Technical Solution of the Present Invention is as Follows:

An integrated two-dimensional beam steering device that is based on lens, comprising: a substrate, an input waveguide, a connecting waveguide, a 1×N optical switch, an electrical interface for the switch, N output waveguides of the switch, N transmitting units, a lens, and a controller, where N is a positive integer (N≥2). The input waveguide, the connecting waveguide, the 1×N optical switch, the electrical interface for the switch, the N output waveguides of the switch, and the N transmitting units are all prepared on the substrate. The N transmitting units are in a two-dimensional array on the upper surface of the substrate. The lens is located directly above the N transmitting units. The focal plane of the lens is parallel to the plane in which the N transmitting units are located. The optical axis of the lens is perpendicular to the plane. The 1×N optical switch has one input port and N output ports. The input port of the 1×N optical switch is connected to the connecting waveguide. The N output ports of the 1×N optical switch are respectively connected to the N transmitting units via N output waveguides of the switch. The light beams output by the N transmitting units are all output through the lens. The control port of the controller is respectively connected to the 1×N optical switch through the electrical interface for the switch.

In the present invention, the input waveguide, the connecting waveguide, the 1×N optical switch, the output waveguides of the switch, and the transmitting units are made of silicon, III-V semiconductor, silicon nitride, or silicon dioxide material.

In the present invention, the input waveguide is a tapered waveguide or a Bragg grating.

In the present invention, the 1×N optical switch is a binary tree structure, or a series structure or a combination of the two.

In the present invention, the N transmitting units are Bragg grating structure.

In the present invention, the lens is a spherical planoconvex lens, a spherical biconvex lens, an aspherical planoconvex lens, or an aspherical biconvex lens.

In the present invention, the input waveguide, the connecting waveguide, the output waveguides of the switch, and the transmitting units all operate in a single mode transverse electric mode or a single mode transverse magnetic mode.

In the present invention, the beam is deflected through an angle by the lens to achieve a specific angle of the beam to the far field. The emission angle of the beam emitted from the specific transmitting unit after being deflected by the lens is determined by the relative position between the transmitting unit and the lens. Therefore, the N transmitting units are arranged on the plane without overlapping, and the pointing of the beam to the N different angles of the far field may be achieved.

The principle of the present invention is that the optical field on the focal plane of the lens near the side of the transmitting unit (referred to as the first focal plane of the lens) and the focal plane on the other side of the lens (referred to as the second focal plane of the lens) satisfy Fourier transform. On the other hand, with the optical field on the second focal plane of the lens as virtual emission light source, the optical field of the second focal plane of the lens and the optical field of the far field satisfy Fourier transform. Therefore, the optical field of the first focal plane of the lens has the same mode field distribution as the optical field of the far field. By changing the arrangement of the transmitting units and the distance between the transmitting unit and the lens, the optical field of the first focal plane of the lens can be changed, thereby obtaining different distributions of the optical field of the far field. While different positions of spots in the optical field of the far field correspond to different pointing angles of the light beams with the second focal plane of the lens as emission light source, so that beam scanning may be realized.

Compared with the prior art, the present invention has the following advantages: The present invention has an all solid state structure with no mechanical parts and shows high reliability. Compared with the beam scanning solutions using liquid crystal and MEMS, the present invention allows the use of non-semiconductor materials; the present invention may select insulator materials according to requirements, withstand higher power, and cover the band where semiconductor materials cannot work. Compared with the solution adopting the optical phased array technology, the controller of the present invention controls the switching function of the 1×N optical switch through the electrical interface for the switch, and only one transmitting unit has light emission at the same time. Therefore, the present invention does not need to simultaneously phase control the optical signals in all the transmitting units as the phased array technology does. In present invention, the control complexity and power consumption are lower, and also, there is no need to control the spacing of the adjacent transmitting units within half the wavelength to eliminate the grating lobe as the phased array technology does. Compared with the solution which combines the integrated planar lens and grating emission, the present invention can realize two-dimensional scanning without changing the wavelength of the optical signal.

DETAILED DESCRIPTIONS OF THE INVENTION AND EMBODIMENTS

In combination with figures and embodiments hereunder provided, the present invention is further expounded. The figures and embodiments are not meant to limit the scope of the present invention.

Figure 1:
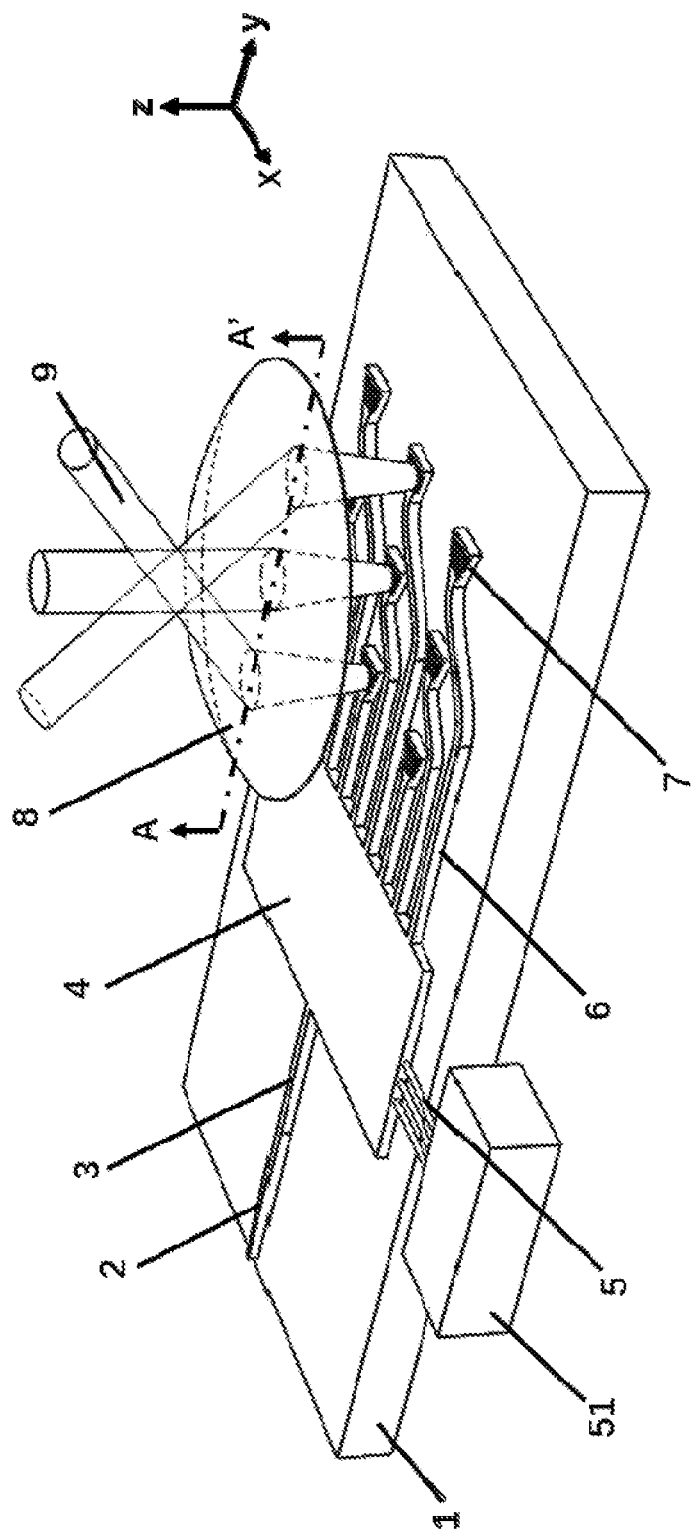
FIG. 1 is a schematic drawing showing the first embodiment of the integrated two-dimensional beam steering device based on lens of the present invention.

As shown in FIG. 1, the lens-based integrated two-dimensional beam steering device of the present invention comprises a substrate 1, an input waveguide 2, a connecting waveguide 3, a 1×N optical switch 4, an electrical interface for the switch 5, N output waveguides of the switch 6, N transmitting units 7, a lens 8, and a controller 51. The input waveguide 2, the connecting waveguide 3, the 1×N optical switch 4, the electrical interface for the switch 5, the N output waveguides of the switch 6, and the N transmitting units 7 are all prepared on the substrate 1. The N transmitting units 7 are in a two-dimensional array on the upper surface of the substrate 1. The lens 8 is located directly above the N transmitting units 7. The focal plane of the lens 8 is parallel to the plane in which the N transmitting units 7 are located. The optical axis of the lens 8 is perpendicular to the plane. The 1×N optical switch 4 has one input port and N output ports, where N is a positive integer (N≥2). The input port of the 1×N optical switch 4 is connected to the connecting waveguide 3. The N output ports of the 1×N optical switch are respectively connected to the N transmitting units 7 via N output waveguides of the switch 6. The light beams output by the N transmitting units 7 are all output through the lens 8. The control port of the controller 51 is respectively connected to the 1×N optical switch 4 through the electrical interface for the switch 5.

In one embodiment of the present invention, the N is 9.

The input waveguide 2, the connecting waveguide 3, the output waveguides of the switch 6, and the transmitting units 7 are made of silicon, III-V semiconductor, silicon nitride, or silicon dioxide material.

The input waveguide 2 is a tapered waveguide or a Bragg grating.

The 1×N optical switch 4 is a binary tree structure, or a series structure, or a combination of the two.

The N transmitting units 7 are Bragg grating structure.

The lens 8 is a spherical plano-convex lens, a spherical biconvex lens, an aspherical plano-convex lens, or an aspherical biconvex lens.

The input waveguide 2, the connecting waveguide 3, the output waveguides of the switch 6, and the transmitting units 7 all operate in a single mode transverse electric mode or a single mode transverse magnetic mode.

Preferably, the above devices operate in a single mode transverse electric (TE) mode.

FIG. 1 shows the light paths of the three light beams 9 emitted from three different transmitting units 7 to free space at different times to demonstrate the deflection of the light beams 9 emitted by different transmitting units 7 after passing through the lens 8. It should be pointed out that only one of the transmitting units has the beam to be emitted at any time in the present invention.

The input waveguide 2 is a tapered waveguide for end coupling with a tapered and lens fiber, or other structure for realizing optical signal coupling.

Preferably, the input waveguide 2 is a taper waveguide, and the external input adopts a tapered and lens fiber to perform end coupling with the chip.

The N transmitting units 7 are Bragg grating structure.

The working area of the lens 8 needs to be sufficiently large that the light beams emitted from the N transmitting units can illuminate the working area of the lens 8.

Figure 2:
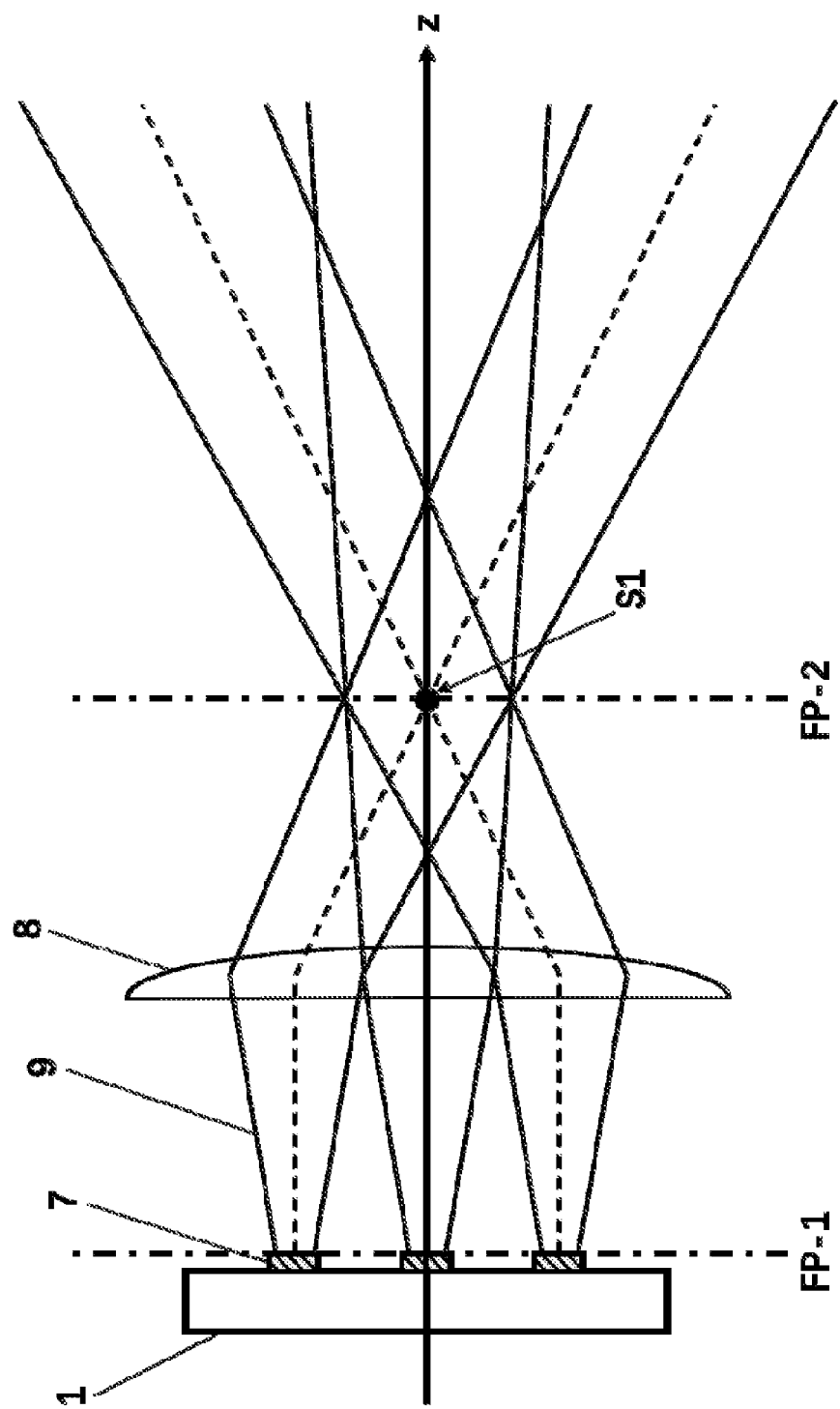
FIG. 2 is a schematic drawing showing the optical field on the cross section AA' of FIG. 1.

As shown in FIG. 2, in the optical field on the cross section AA' of FIG. 1, the light beams 9 are emitted from the transmitting units 7 on the substrate 1 and then pass through the lens 8, and the directions of the optical beams are deflected. If the center line of the three optical beam (the dotted line within the optical beam in FIG. 2) is parallel to the optical axis of the lens 8 along z direction, then the center line of the optical beam will intersect on the focal plane FP-2 behind the lens 8, and simultaneously intersect with z axis, as indicated by point S1 in FIG. 2. With point S1 as the virtual light source, the light beams emitted from different transmitting units 7 are equivalent to the light beams emitted from the virtual light source at point S1 to different directions. In FIG. 2, the focal plane FP-1 of the lens 8 on the side of the transmitting units 7 coincides with the emission plane of the transmitting units 7. Since FP-2 is used as the reference plane, the optical field of the focal plane FP-1 has the same mode field distribution as the optical field of the far field. Therefore, the emission plane of the transmitting units coincides with the focal plane FP-1 to obtain the smallest spot size on the FP-1 plane, i.e., the light beam of the far field has the smallest divergence angle.

Figure 3:
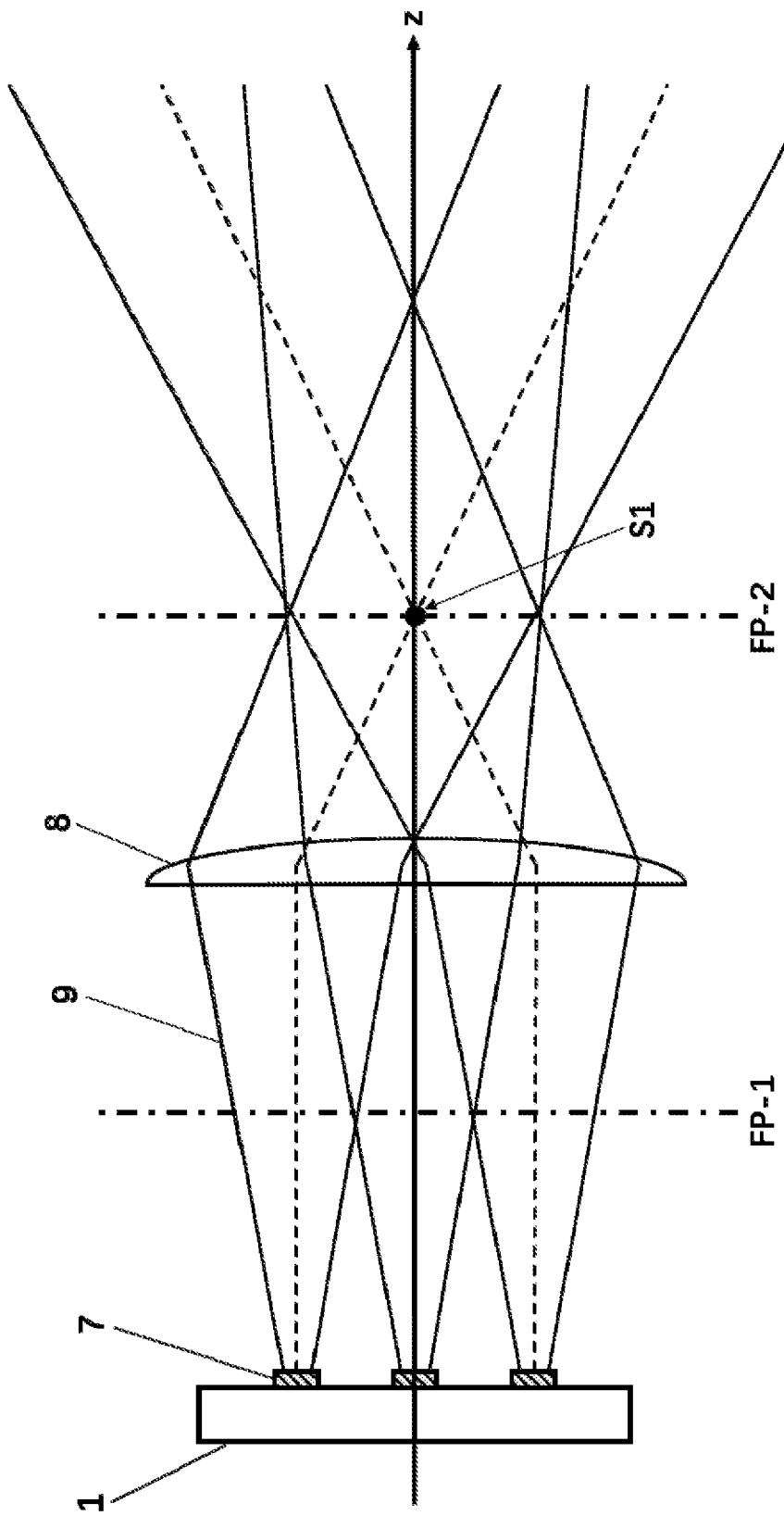
FIG. 3 is a schematic drawing showing another optical field on the cross section AA' of FIG. 1.

As shown in FIG. 3, compared with FIG. 2, the emission plane of the transmitting units 7 does not coincide with the focal plane FP-1 of the lens 8. As a result, the spot becomes larger when the light beams emitted from the transmitting units 7 reach the FP-1 plane due to the divergence of the light beams. Compared with the structure of FIG. 2, although the divergence angle of light beams of the far field is increased, the gap between the light beams of the far field is reduced or absent, reducing the dead zone (WK: blind zone?) of light beam scanning.

Figure 4:
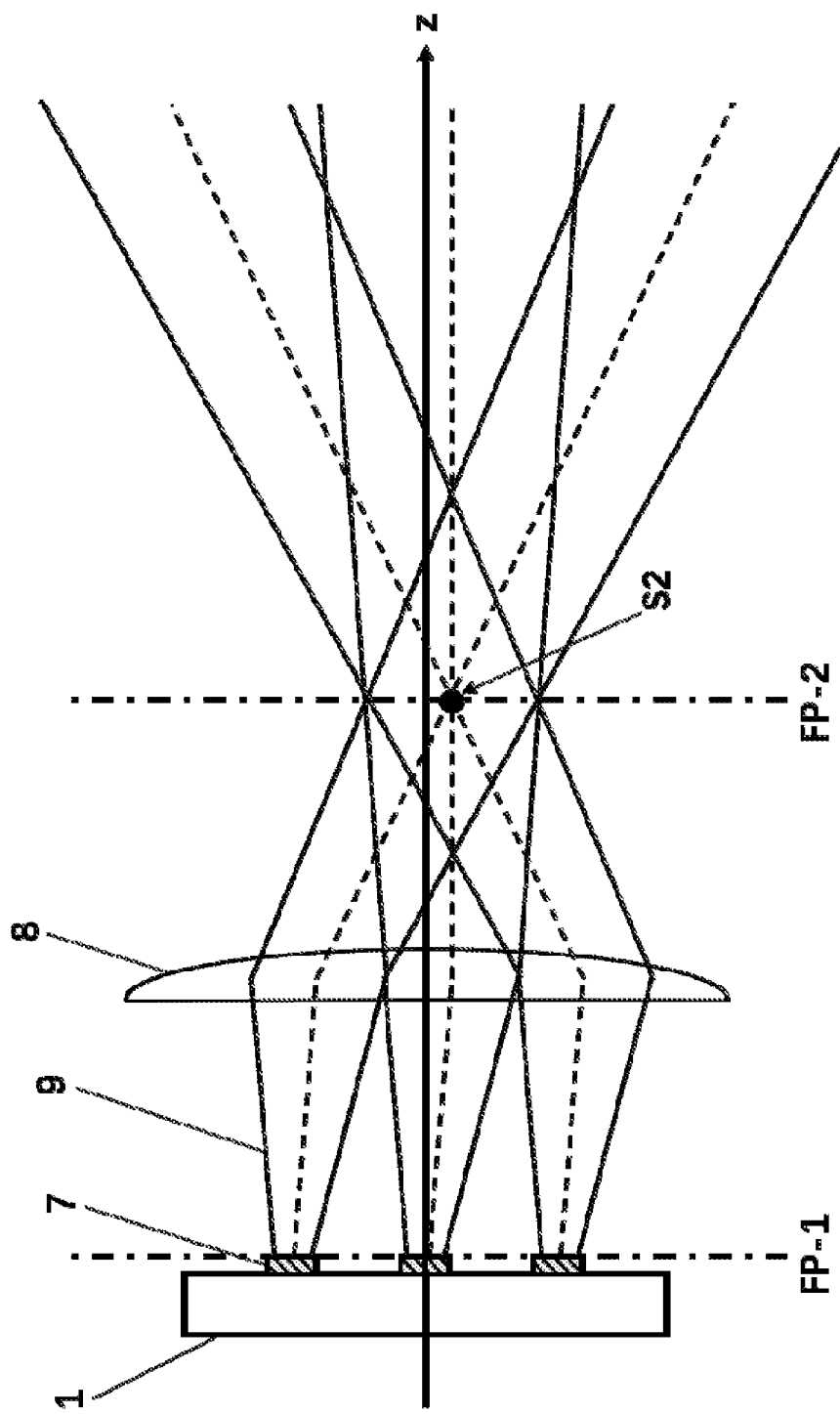
FIG. 4 is a schematic drawing showing the third optical field on the cross section AA' of FIG. 1.

As shown in FIG. 4, the light beams 9 emitted by the transmitting units 7 are at an angle to the optical axis of the lens 8 (i.e., the z axis). If the angles of the light beams emitted by different transmitting units are the same, then, after the light beams pass through the lens 8, the center lines of the light beams (the dotted lines within the light beams 9 in FIG. 4) still intersect on the focal plane FP-2, but no longer intersect with the z axis, which is indicated by point S2 in FIG. 4. Taking point S2 as the virtual light source, the light beams emitted from different transmitting units 7 are equivalent to the light beams emitted from the virtual light source at point S2 to different directions. With FP-2 as the reference plane, the optical field of the focal plane FP-1 has the same mode field distribution as the optical field of the far field. Therefore, tilt of the light beams does not change the point angle of the optical beams of the far field, but it may change the divergence angle of the light beams of the far field. FIG. 4 illustrates that the present invention has a degree of tolerance for the emission angle of the light beams emitted by the transmitting units as long as the obliquely emitted light beam still illuminate the working area of the lens. In addition, if the emission angle of the transmitting units is related to the wavelength of the input optical signal, as in the case where the transmitting unit is a Bragg grating, the present invention also has a degree of tolerance for the wavelength shift of the emitted light beam.

Figure 5:
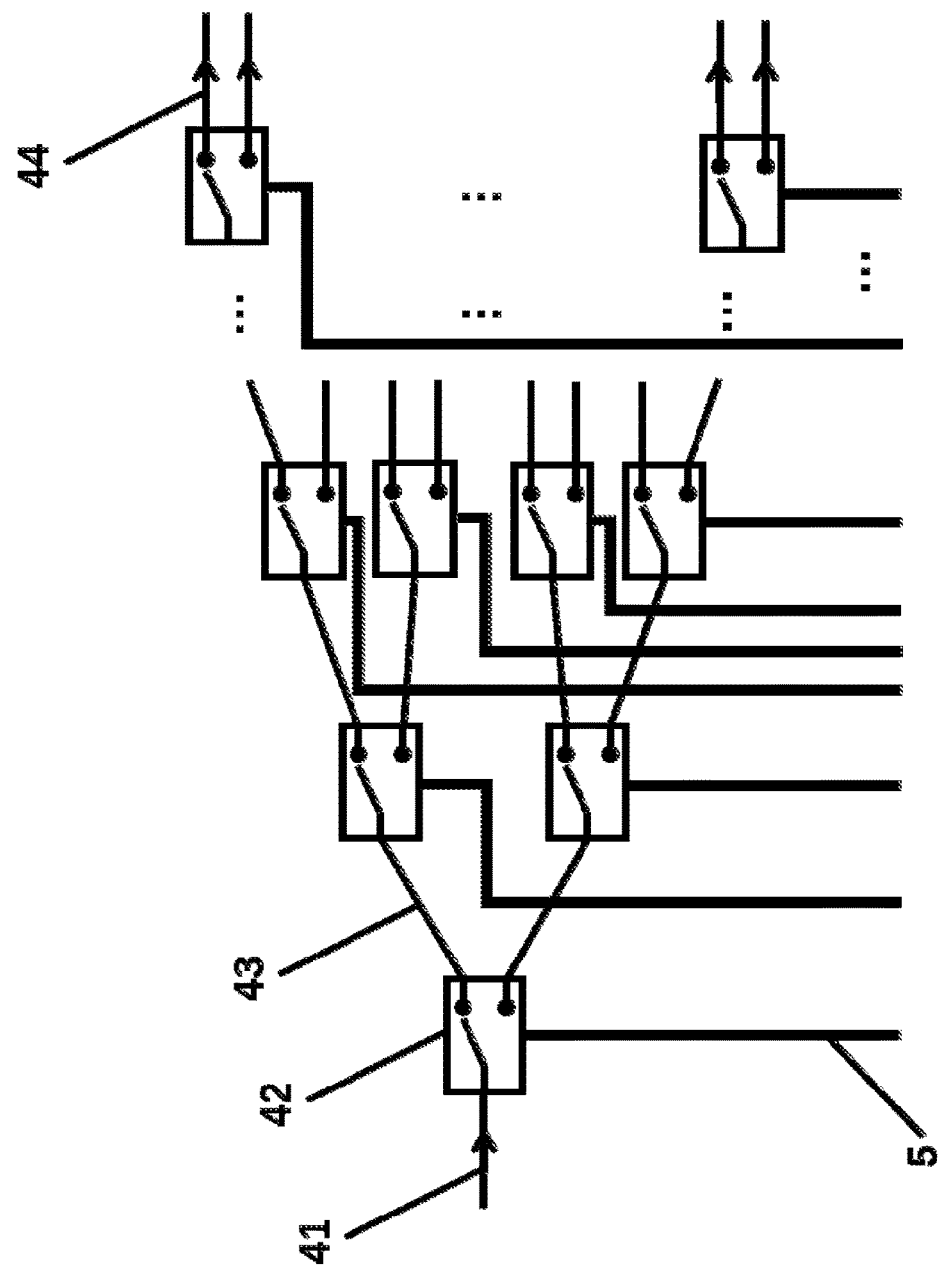
FIG. 5 shows a 1×N optical switch structure based on a binary tree structure in the present invention.

As shown in FIG. 5, in the 1×N optical switch structure based on a binary tree structure in the present invention, the optical signal enters a 1×2 optical switch 42 through the input port 41, splits into two paths, passes through the connecting waveguide 43 to enter 1×2 optical switch in the next stage, and finally reaches the N output ports 44 after passing through optical switches in several stages. If N cannot be expressed as a power exponent of 2, the number of 1×2 optical switches in the last stage can be appropriately reduced to reduce the number of output ports. Each 1×2 optical switch has a control port, and the control ports of all 1×2 optical switches together form the electrical interface for the 1×N optical switch 5. The structure may approximately equalize the number of 1×2 optical switches that pass through input port 41 to output port 44 on each path, equalizing losses on different paths.

Figure 6:
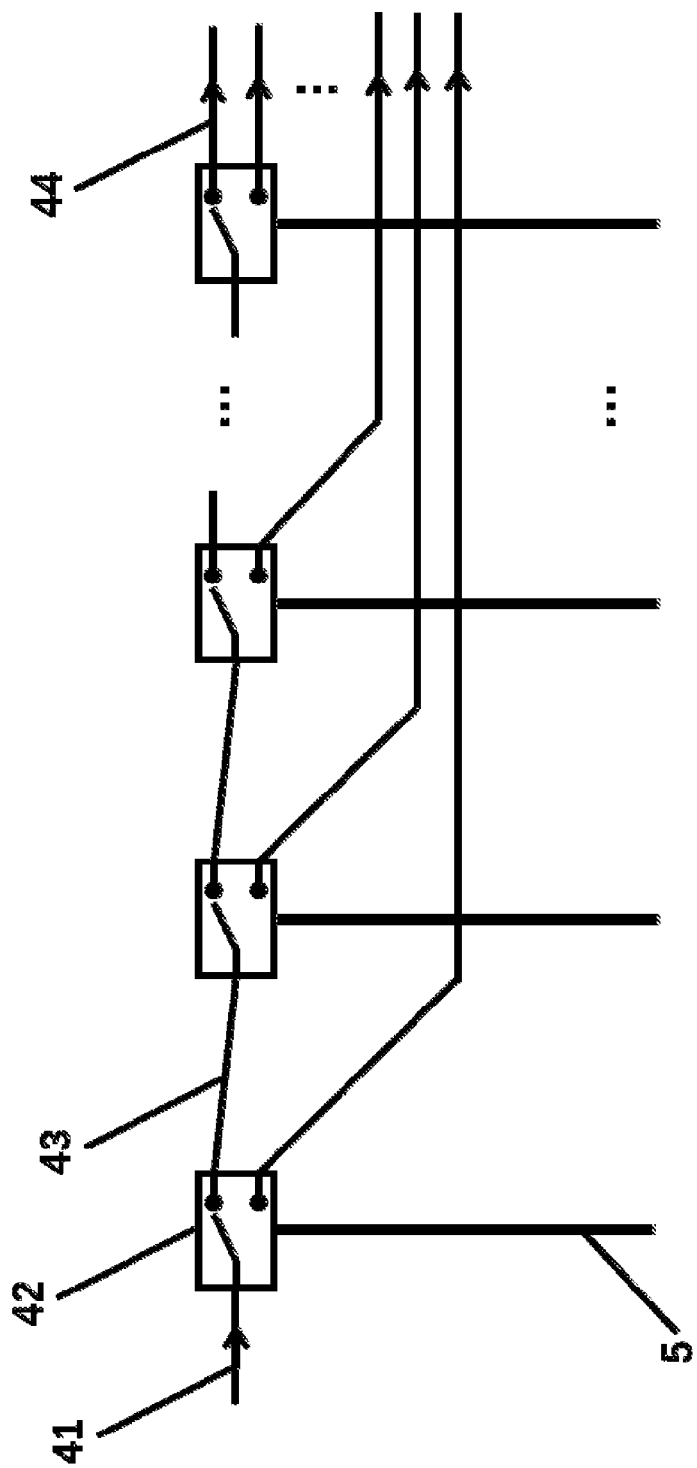
FIG. 6 shows a 1×N optical switch structure based on a chain structure in the present invention.

As shown in FIG. 6, in the 1×N optical switch based on a chain structure in the present invention, the optical signal enters the first 1×2 optical switch 42 through the input port 41 and splits into two paths, one connects to the next 1×2 optical switch, and the other connects directly to the output port 44. For each subsequent 1×2 optical switch except the last 1×2 optical switch, one path is connected to the next-stage optical switch and the other path is connected to the output port. For the last 1×2 optical switch, both paths are directly connected to the output port. Each 1×2 optical switch has a control port, and the control ports of all 1×2 optical switches together form the electrical interface for the 1×N optical switch 5. The structure has advantages for some 1×2 optical switches that can maintain a state without power consumption, such as MEMS-based optical switches, because each output path switch only needs to control two optical switches.

In summary, the present invention has an all solid state structure, no mechanical parts, and high reliability. In the present invention, only one transmitting unit has light emission at the same time, and the control complexity and power consumption are lower. The divergence angle of the light beam of the far field can be controlled by adjusting the distance between the emission plane and the focal plane of the lens. The present invention can realize two-dimensional scanning without changing the wavelength of the optical signal. In the present invention, it does not need to integrate a plurality of optical materials on the chip, so the loss is lower.

We claim:

1. A lens-based integrated two-dimensional beam steering device, comprising:
    a substrate (1) having an upper surface,
    an input waveguide (2),
    a connecting waveguide (3),
    a 1×N optical switch (4) having a control port, one input port, and N output ports;
    an electrical interface for the switch (5),
    N output waveguides of the switch (6),
    N transmitting units (7) having a plane where the N transmitting units (7) are located,
    a lens (8) having a focal plane and an optical axis, and
    a controller (51) having a control port,
    where N is a positive integer that equals to or more than 2;
    the input waveguide (2), the connecting waveguide (3), the 1×N optical switch (4), the electrical interface for the switch (5), the N output waveguides of the switch (6), and the N transmitting units (7) are all prepared on the substrate (1), and the N transmitting units (7) are in a two-dimensional array on the upper surface of the substrate (1);
    the lens (8) is located directly above the N transmitting units (7), the focal plane of the lens (8) is parallel to the plane where the N transmitting units (7) are located, and the optical axis of the lens (8) is perpendicular to the plane where the N transmitting units (7) are located;

the input port of the 1×N optical switch (4) is connected to the connecting waveguide (3), the N output ports of the 1×N optical switch (4) are respectively connected to the N transmitting units (7) via N output waveguides of the switch (6);

light beams output by the N transmitting units (7) are all output through the lens (8); and the control port of the controller (51) is respectively connected to the control port of the 1×N optical switch (4) through the electrical interface for the switch (5).

2. The lens-based integrated two-dimensional beam steering device of claim 1, wherein the input waveguide (2) is made of silicon, III-V semiconductor, silicon nitride, or silicon dioxide material.

3. The lens-based integrated two-dimensional beam steering device of claim 1, wherein the connecting waveguide (3) is made of silicon, III-V semiconductor, silicon nitride, or silicon dioxide material.

4. The lens-based integrated two-dimensional beam steering device of claim 1, wherein the 1×N optical switch (4) is made of silicon, III-V semiconductor, silicon nitride, or silicon dioxide material.

5. The lens-based integrated two-dimensional beam steering device of claim 1, wherein the output waveguides of the switch (6) are made of silicon, III-V semiconductor, silicon nitride, or silicon dioxide material.

6. The lens-based integrated two-dimensional beam steering device of claim 1, wherein the N transmitting units (7) are made of silicon, III-V semiconductor, silicon nitride, or silicon dioxide material.

7. The lens-based integrated two-dimensional beam steering device of claim 1, wherein the input waveguide (2) is a tapered waveguide or a Bragg grating.

8. The lens-based integrated two-dimensional beam steering device of claim 1, wherein the 1×N optical switch (4) is a binary tree structure, a series structure, or a combination thereof.

9. The lens-based integrated two-dimensional beam steering device of claim 1, wherein the N transmitting units (7) are Bragg grating structure.

10. The lens-based integrated two-dimensional beam steering device of claim 1, wherein the lens (8) is a spherical plano-convex lens, a spherical biconvex lens, an aspherical plano-convex lens, or an aspherical biconvex lens.

11. The lens-based integrated two-dimensional beam steering device of claim 1, wherein the input waveguide (2), the connecting waveguide (3), the output waveguides of the switch (6), and the N transmitting units (7) operates in a single mode transverse electric mode.

12. The lens-based integrated two-dimensional beam steering device of claim 1, wherein the input waveguide (2), the connecting waveguide (3), the output waveguides of the switch (6), and the N transmitting units (7) operates in a single mode transverse magnetic mode.

* * * * *